UNITED STATES PATENT OFFICE.

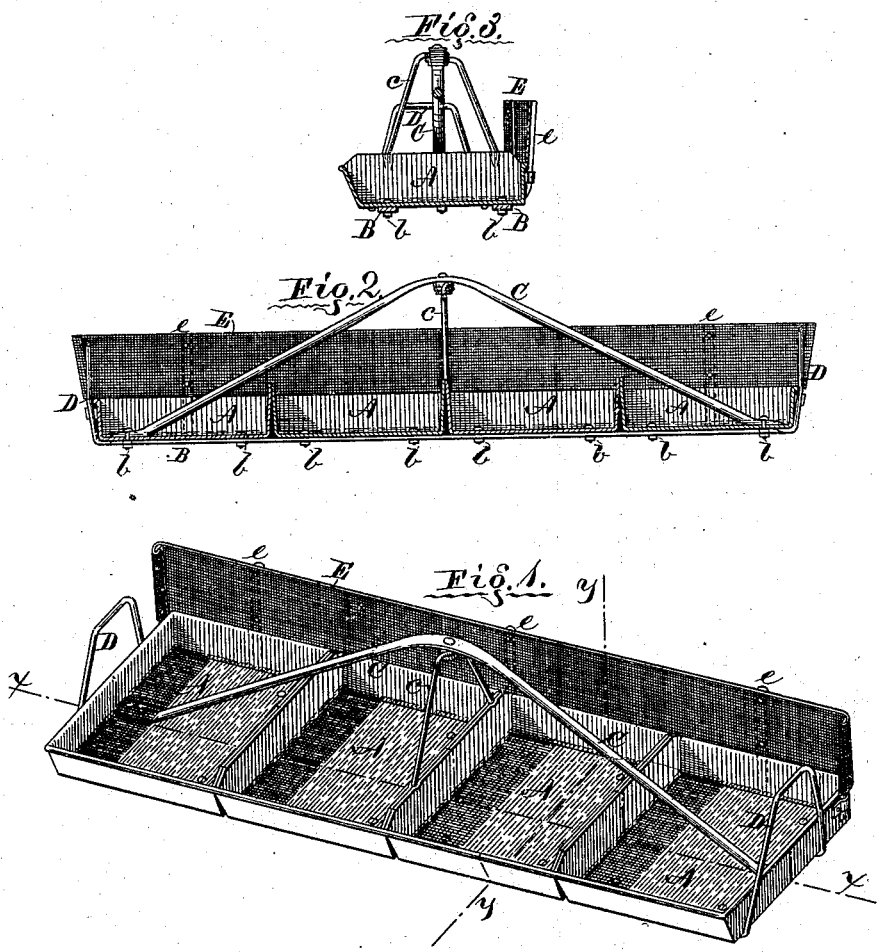

LORENZO B. CANFIELD, OF SYRACUSE, NEBRASKA.

IMPROVEMENT IN GRASSHOPPER-DESTROYERS.

Specification forming part of Letters Patent No. 187,509, dated February 20, 1877; application filed November 9, 1876.

*To all whom it may concern:*

Be it known that I, LORENZO B. CANFIELD, of Syracuse, county of Otoe, State of Nebraska, have invented certain Improvements in Grasshopper-Destroyers, of which the following is a specification:

The nature of my invention relates to a device to be carried or propelled in any desirable manner over land infested by grasshoppers, and containing a substance destructive to the life of the insect by contact with their bodies; and the invention consists in the use of one or more pans, constructed as hereinafter more fully set forth, and adapted to contain petroleum, or some of its well-known preparations, so that as they are passed along over the land the rising grasshoppers will fall or alight within them, and be either destroyed therein, or, hopping out, die on the ground from the effects of the contact with the oil.

To enable others skilled in the art to make and use my invention, I will proceed to describe the same, with reference to the accompanying drawing, in which—

Figure 1 is a perspective view of a machine embodying my invention. Fig. 2 is a longitudinal sectional view on the line $x\ x$ in Fig. 1, and Fig. 3 is a cross-section on the line $y\ y$ in Fig. 1.

Referring to the parts by letters, letters A represent the pans, made of zinc, tin, or any light suitable material, and of any suitable size and depth adapted to the method of propulsion. For carrying by hand, I have found about two to three feet long, two feet wide, and three to four inches deep a very good size. The sides of the pans may all be perpendicular to the bottom, except the front side, which should be a little inclined, as shown at Figs. 1 and 3, to facilitate passing over grass, oats, wheat, and vegetation similar in size. The pans A are placed in a row, close to each other, and united by bottom straps B, to which they are secured by rivets $b$.

C is a truss, its ends secured to the extreme ends and bottom of the two outer pans A, and its central part secured upon the upper end of a king-post, $c$. D D are handles, one at each end of the series of pans. E is an upwardly-extended back for the pans, and is formed by simply extending the backs of the pans themselves upward, or by attaching a light cloth back to standards $e$.

It will be evident that the series of pans may be extended to any desired length, or that a single pan may be used short enough to sustain its own weight, or made longer and braced, as described, and divided transversely by walls into compartments, which will prevent the oil running all to one end of the device when such end is lower than the other.

In operation the device is carried by the handles D, with the pans near to the ground, and as it is advanced the insects jump up and are received in the advancing pan, or, striking the back E, fall into the petroleum, of which there is one-half inch or more in depth in the pans, where they die, or, jumping therefrom, die on the ground.

What I claim as new, and desire to secure by Letters Patent, is—

1. The pans A, connected by the plates B and truss C, and provided with handles D, substantially as described, and for the purpose specified.

2. The pans A, connected by the plates B and truss C, and provided with handles D and back E, substantially as and for the purpose specified.

LORENZO B. CANFIELD.

Witnesses:
F. F. GORDON,
GEO. W. HOUCK.